(12) United States Patent
Biehn et al.

(10) Patent No.: US 10,668,480 B1
(45) Date of Patent: Jun. 2, 2020

(54) SYSTEMS AND METHOD FOR REMOVAL OF ACID GAS IN A CIRCULATING DRY SCRUBBER

(71) Applicant: Mississippi Lime Company, St. Louis, MO (US)

(72) Inventors: Curtiss Biehn, O'Fallon, IL (US); Randy Griffard, St. Mary, MO (US); Mark Degenova, Ste. Genevieve, MO (US); Eric Van Rens, Ballwin, MO (US)

(73) Assignee: Mississippi Lime Company, St. Louis, MO (US)

( * ) Notice: Subject to any disclaimer, the term of this patent is extended or adjusted under 35 U.S.C. 154(b) by 0 days.

(21) Appl. No.: 16/216,646

(22) Filed: Dec. 11, 2018

Related U.S. Application Data

(63) Continuation-in-part of application No. 16/041,213, filed on Jul. 20, 2018, which is a continuation of (Continued)

(51) Int. Cl.
*B02C 23/08* (2006.01)
*B01D 53/50* (2006.01)
(Continued)

(52) U.S. Cl.
CPC ............ *B02C 23/08* (2013.01); *B01D 53/502* (2013.01); *B01D 53/83* (2013.01); *C01F 11/02* (2013.01); *C04B 2/06* (2013.01); *C09C 1/02* (2013.01); *C09C 1/021* (2013.01); *B01D 53/10* (2013.01); *B01D 53/74* (2013.01); *B01D 2251/404* (2013.01); *B01D 2251/604* (2013.01); *B01D 2253/304* (2013.01); *B01D 2253/306* (2013.01)

(58) Field of Classification Search
CPC .... B01D 53/74; B01D 53/83; B01D 53/8609; B01D 2251/404; B01D 2252/10; B01D 2253/112; B01D 2257/302; B01D 2258/0283; B01J 8/00; B01J 8/08; B01J 8/18; B01J 8/24; B01J 2208/00; B01J 2208/00743; B01J 2208/00761; B01J 2208/00805; B01J 2220/00
See application file for complete search history.

(56) References Cited

U.S. PATENT DOCUMENTS

| | | |
|---|---|---|
| 309,328 A | 12/1884 | Adams |
| 671,621 A | 4/1901 | Dodge |
| | (Continued) | |

FOREIGN PATENT DOCUMENTS

| | | |
|---|---|---|
| GB | 1394330 | 5/1975 |
| JP | 2007031212 A | 2/2007 |

OTHER PUBLICATIONS

Nolan, Paul S. and Brinker, Michael R., "Hydrated Lime for Control of Acid Gas Emissions from Coal-Fired Power Plants," (12 pages).
(Continued)

*Primary Examiner* — Timothy C Vanoy
(74) *Attorney, Agent, or Firm* — Lewis Rice LLC

(57) ABSTRACT

Systems and methods for the use of highly reactive hydrated lime (HRH) in circulating dry scrubbers (CDS) to remove sulfur dioxide ($SO_2$) and other acid gases from the flue gas.

19 Claims, 5 Drawing Sheets

Related U.S. Application Data application No. 15/655,201, filed on Jul. 20, 2017, now Pat. No. 10,155,227, which is a continuation-in-part of application No. 14/846,554, filed on Sep. 4, 2015, now Pat. No. 9,751,043, said application No. 16/041,213 is a continuation-in-part of application No. 15/655,527, filed on Jul. 20, 2017, now Pat. No. 10,046,273, which is a continuation of application No. 14/846,554.

(60) Provisional application No. 62/597,909, filed on Dec. 12, 2017, provisional application No. 62/046,696, filed on Sep. 5, 2014.

(51) Int. Cl.
| | |
|---|---|
| *C01F 11/02* | (2006.01) |
| *C09C 1/02* | (2006.01) |
| *C04B 2/06* | (2006.01) |
| *B01D 53/83* | (2006.01) |
| *B01D 53/10* | (2006.01) |
| *B01D 53/74* | (2006.01) |

(56) References Cited

U.S. PATENT DOCUMENTS

| | | | |
|---|---|---|---|
| 1,613,341 A | | 1/1927 | Carson |
| 1,679,149 A | | 7/1928 | Berg |
| 1,954,211 A | | 4/1934 | Kuntz |
| 2,894,820 A | | 7/1959 | Rikard et al. |
| 3,366,450 A | | 1/1968 | Waldeck |
| 3,839,551 A | | 10/1974 | Dozsa et al. |
| 3,929,417 A | | 12/1975 | Rosa et al. |
| 4,197,285 A | | 4/1980 | Yang et al. |
| 4,274,842 A | | 6/1981 | Lindau |
| 4,330,514 A | | 5/1982 | Nagai et al. |
| 4,346,064 A | | 8/1982 | Leon |
| 4,548,797 A | | 10/1985 | Sauer et al. |
| 4,555,390 A | | 11/1985 | Bhatia |
| 4,636,379 A | | 1/1987 | Bestek et al. |
| 4,666,690 A | | 5/1987 | Sommerlad |
| 4,780,291 A | | 10/1988 | Sayler et al. |
| 4,848,995 A | * | 7/1989 | Samish ............... B01D 53/501 62/633 |
| 5,173,279 A | | 12/1992 | Dumont et al. |
| 5,223,239 A | | 6/1993 | Moran et al. |
| 5,277,837 A | | 1/1994 | Dumont et al. |
| 5,332,436 A | | 7/1994 | Walker, Jr. et al. |
| 5,492,685 A | | 2/1996 | Moran et al. |
| 5,705,141 A | | 1/1998 | Dumont et al. |
| 6,200,543 B1 | | 3/2001 | Allebach et al. |
| 6,322,769 B1 | | 11/2001 | Langelin et al. |
| 6,685,902 B2 | | 2/2004 | Morin et al. |
| 7,338,649 B2 | | 3/2008 | Kluege et al. |
| 7,744,678 B2 | | 6/2010 | Laudet et al. |
| 8,518,353 B1 | * | 8/2013 | Neathery ............... B01D 53/508 422/139 |
| 8,709,348 B1 | | 4/2014 | Neathery et al. |
| 8,715,600 B1 | | 5/2014 | Gayheart |
| 9,751,043 B1 | * | 9/2017 | Biehn ............... B01D 53/79 |
| 10,046,273 B1 | * | 8/2018 | Biehn ............... B01D 53/79 |
| 10,155,227 B2 | * | 12/2018 | Biehn ............... C09C 1/021 |
| 2009/0246524 A1 | | 10/2009 | Ohmi et al. |
| 2009/0264117 A1 | | 10/2009 | Tilquin et al. |
| 2011/0150755 A1 | | 6/2011 | Euston |
| 2012/0134903 A1 | | 5/2012 | Brasseur et al. |
| 2013/0156664 A1 | | 6/2013 | Jankura et al. |
| 2016/0201903 A1 | | 7/2016 | Brand et al. |
| 2016/0236144 A1 | | 8/2016 | Rahlin |
| 2018/0264403 A1 | * | 9/2018 | Tate ............... B01D 53/508 |

OTHER PUBLICATIONS

Gale, Thomas K., Cannon, Jared W., Nolan, Paul S., Brinker, Michael R., Brasseur, Alain and Laudet, Alain, "Hydrated Lime for SO3 Removal," Paper #128 (16 pages).

Srivastava, R.K., Miller, C.A., Erickson, C. and Jambhekar, R., "Emissions of Sulfur Trioxide From Coal-Fired Power Slants," Technical Publication, Riley Power Inc, a Babcock Power Inc. company, www.babbockpower.com, presented at Power-Gen International 2002, Dec. 10-12, 2002, Orlando, Florida (20 pages).

"A Guidebook to Particle Size Analysis," Horiba Scientific, pp. 1-29 (17 pages).

Peterson, Joseph R., Mailer, Gordon, Burnette, Andrew and Rhudy, Richard G., "Pilot-Scal Evaluation of Sorbent Injection to Remove SO3 and HCL," Managing Hazardous Air Pollutants State of the Art, Electric Power Research Institute TR-101890, printed Nov. 16, 2009, pp. 520-538 (22 pages).

Oates, Lime and Limestone: Chemistry and Technology, Production and Use, 2007, Chapter 17, pp. 192-198 (8 pages).

"Circulating Dry Scrubbers: A New Wave in FGD?," Power Engineering, pp. 1-6, available at http://www.power-eng.com/articles/print/volume-155/issues11, printed Sep. 2, 2015 (6 pages).

Bauer, Wolf G., The Lime Plant Operator, Hydration in Theory and Practice, Pit and Quarry, vol. 40, No. 1, pp. 168-170, Jul. 1947 (3 pages).

* cited by examiner

|  | Load | Op. hrs. | Hydrate lb/hr, ave | Scrubber Temps, °F | |
|---|---|---|---|---|---|
|  |  |  |  | Outlet | Inlet |
| HRH | High | 198 | 567 | 171 | 284 |
|  | Med | 124 | 706 | 174 | 251 |
|  | Low | 120 | 956 | 179 | 224 |
| FGT | High | 151 | 1,639 | 172 | 282 |
|  | Med | 79 | 1,573 | 176 | 251 |
|  | Low | 58 | 2,488 | 178 | 229 |

FIG. 3

SYSTEMS AND METHOD FOR REMOVAL OF ACID GAS IN A CIRCULATING DRY SCRUBBER

CROSS REFERENCE TO RELATED APPLICATION(S)

This application claims the benefit of U.S. Provisional Patent Application Ser. No. 62/597,909, filed Dec. 12, 2017. This application is also a Continuation-in-Part (CIP) of U.S. Utility patent application Ser. No. 16/041,213, filed Jul. 20, 2018 which is a Continuation of U.S. Utility patent application Ser. No. 15/655,201, filed Jul. 20, 2017 and now U.S. Pat. No. 10,155,227, which is a Continuation-in-Part (CIP) of U.S. Utility patent application Ser. No. 14/846,554, filed Sep. 4, 2015 and now U.S. Pat. No. 9,751,043, which claims the benefit of U.S. Provisional Patent Application Ser. No. 62/046,696, filed Sep. 5, 2014. U.S. Utility patent application Ser. No. 16/041,213 is also a Continuation-in-Part (CIP) of U.S. Utility patent application Ser. No. 15/655,527, filed Jul. 20, 2017, which is a Continuation of U.S. Utility patent application Ser. No. 14/846,554, filed Sep. 4, 2015 and now U.S. Pat. No. 9,751,043, and which, in turn, claims the benefit of U.S. Provisional Patent Application Ser. No. 62/046,696, filed Sep. 5, 2014. The entire disclosure of all the above documents is herein incorporated by reference.

BACKGROUND OF THE INVENTION

1. Field of the Invention

The invention relates generally to air pollution control processes aimed at controlling acid gases that are emitted from industrial, utility, incineration, or metallurgical process. Specifically the invention concerns the mitigation of Sulfur Dioxide ($SO_2$), Hydrochloric acid (HCl), and Sulfur Trioxide ($SO_3$) using a high reactivity calcium hydroxide (hydrated lime) in a circulating dry scrubber (CDS).

2. Description of the Related Art

Many efforts have been made to develop materials for improved capability of cleaning or "scrubbing" flue gas or combustion exhaust. Most of the interest in such scrubbing of flue gas is to eliminate particular compositions, specifically acid gases, that contribute to particularly detrimental known environmental effects, such as acid rain.

Flue gases are generally very complex chemical mixtures which comprise a number of different compositions in different percentages depending on the material being combusted, the type of combustion being performed, impurities present in the combustion process, and specifics of the flue design. However, the release of certain chemicals into the atmosphere which commonly appear in flue gases is undesirable, and therefore their release is generally regulated by governments and controlled by those who perform the combustion.

Some of the chemicals that are subject to regulation are certain acid gases. A large number of acid gases are desired to be, and are, under controlled emission standards in the United States and other countries. This includes compounds such as, but not limited to, hydrogen chloride (HCl), sulfur dioxide ($SO_2$) and sulfur trioxide ($SO_3$). Sulfur trioxide can evidence itself as condensable particulate in the form of sulfuric acid ($H_2SO_4$). Condensable particulate can also be a regulated emission.

Flue gas exhaust mitigation is generally performed by devices called "scrubbers". Scrubbers introduce chemical compounds into the flue gas. The compounds then react with the undesirable compounds which are intended to be removed. Through these reactions, the undesirable compounds are either captured and disposed of, or turned into a less harmful compound prior to their exhaust, or both. In addition to controlling the emissions for environmental reasons, it is desirable for many combustion plant operators to remove acid gases from the plant's flue gas to prevent the acid gases from forming powerful corroding compounds which can damage flues and other equipment.

These acid gases can arise from a number of different combustion materials, but are fairly common in fossil fuel combustion (such as oil or coal) due to sulfur being present as a common contaminant in the raw fuel. Most fossil fuels contain some quantity of sulfur. During combustion, sulfur in the fossil fuel can oxidize to form sulfur oxides. A majority of these oxides forms sulfur dioxide ($SO_2$), but a small amount of sulfur trioxide ($SO_3$) can also be formed. Selective Catalyst Reduction (SCR) equipment, commonly installed for the removal of nitrogen oxides ($NO_x$), will also oxidize a portion of the $SO_2$ in a flue gas to $SO_3$.

$SO_2$ is a gas that contributes to acid rain and regional haze. Since the 1970's, clean air regulations have been designed to reduce emissions of $SO_2$ from industrial processes at great benefit to the environment and human health. For large emitters, the use of wet and dry scrubbing has led to the reduction of $SO_2$. Smaller emitters, however, seek out less costly capital investment to control $SO_2$ emissions in order to remain operating and produce electricity or steam. Similarly, halides in fossil fuels (such as chlorine and fluorine) are combusted and form their corresponding acid in the flue gas emissions. The halogenated acids also contribute to corrosion of internal equipment or, uncaptured, pollute the air via stack emissions.

However, mitigation of the above undesirable compounds can be very difficult. Because of the required throughput of a power generation facility, flue gases often move through the flue very fast and thus are present in the area of scrubbers for only a short period of time. Further, many scrubbing materials often present their own problems. Specifically, having too much of the scrubbing material could cause problems with the plant's operation from the scrubber material clogging other components or building up on moving parts.

Flue gas treatment has become a focus of electric utilities and industrial operations due to increasingly tighter air quality standards. As companies seek to comply with air quality regulations, the need arises for effective flue gas treatment options. Alkali species based on alkali or alkaline earth metals are common sorbents used to neutralize the acid components of the flue gas.

One commonly used material for the scrubbing of acid gases is hydrated lime. It has been established that hydrated lime can provide a desirable reaction to act as a mitigation agent. Hydrated lime reacts with acid gases to form calcium salts such as in accordance with the following equations:

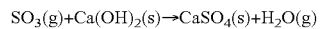

$$SO_3(g) + Ca(OH)_2(s) \rightarrow CaSO_4(s) + H_2O(g)$$

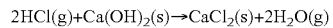

$$2HCl(g) + Ca(OH)_2(s) \rightarrow CaCl_2(s) + 2H_2O(g)$$

Hydrated lime systems have been proven successful in many full scale operations. These systems operate continuously to provide utility companies with a dependable, cost-effective means of acid gas control.

These hydrated lime compositions specifically focus on high surface area based on the theories of Stephen Brunauer, Paul Hugh Emmett, and Edward Teller (commonly called the BET theory and discussed in S. Brunauer, P. H. Emmett and E. Teller, J. Am. Chem. Soc., 1938, 60, 309, the entire disclosure of which is herein incorporated by reference). This methodology particularly focuses on the available surface area of a solid for absorbing gases—recognizing that a surface, in such circumstances, can be increased by the presence of pores and related structures. The most effective hydrated lime sorbents for dry sorbent injection have high (greater than 20 m²/g) BET surface area.

Two examples of such compositions with increased BET surface areas are described in U.S. Pat. Nos. 5,492,685 and 7,744,678, the entire disclosures of which are herein incorporated by reference. Because of this, commercially available products are currently focused on obtaining lime hydrate with particularly high BET surface areas. It is generally believed that the BET surface area needs to be above 20 m²/g to be effective and, in many recent hydrated lime compositions, the BET surface area is above 30 m²/g in an attempt to continue to improve efficiency. These sorbents offer good conveying characteristics and good dispersion in the flue gas, which is necessary for high removal rates. Use of a higher quality, high reactivity source of hydrated lime allows for better stoichiometric ratios than previous attempts that utilized lower quality hydrated lime originally targeted for other industries such as wastewater treatment, construction, asphalt, and the like.

The reaction of hydrated lime with acid gas (such as $SO_3$) is generally assumed to follow the diffusion mechanism. The acid gas removal is the diffusion of $SO_3$ from the bulk gas to the sorbent particles. Thus, high surface area does not itself warrant a prediction in improved removals of acid gases. Specifically, high pore volume of large pores is generally believed to be required to minimize the pore plugging effect and therefore BET surface area has been determined to be a reasonable proxy for effectiveness of lime hydrates in removal of acid gases. Conventional wisdom also indicates that smaller particles act as better sorbents.

Lime hydrate meeting the above described characteristics, properties, and reactivity has generally been manufactured according to a commonly known and utilized process. First, a lime feed of primarily calcium oxide (commonly known as quicklime) is continuously grinded using a pulverizing mill until a certain percentage of all the ground particles meet a desired size (e.g., 95% or smaller than 100 mesh). In other words, all of the lime feed is ground together (lime and impurities), without any removal of particles during the grinding, until the batch of lime feed (both the lime and impurities) meets the desired particle size requirements. This continuous grinding is not surprising as the conventional wisdom is that small particles are better and, thus, the more the calcium oxide is grinded, the better.

Second, the quicklime meeting the desired size requirements is then fed into a hydrator, where the calcium oxide reacts with water (also known as slaking), and then flash dried to form calcium hydroxide in accordance with the following equation:

$CaO + H_2O \rightarrow Ca(OH)_2$

Finally, the resultant calcium hydroxide (also known as hydrated lime) is then milled and classified until it meets a desired level of fineness and BET surface area.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

There are described herein systems and methods for the use of highly reactive hydrated lime (HRH) in circulating dry scrubbers (CDS) to remove sulfur dioxide ($SO_2$) and/or other acid gases from flue gas.

In an embodiment, there is described herein, a system for removal of sulfur dioxide ($SO_2$) and/or other acid gases from a flue gas, the system comprising: a flue gas duct including a circulating dry scrubber (CDS); and an injection system for injecting a highly reactive lime hydrate (HRH) into the flue gas in a reactor section prior to particulate collection equipped with a recycle method for the collected ash to return to the reactor section in the CDS. Typically a controlled spray of fine water droplets is also injected in the reactor section of the CDS. The water serves to reduce flue gas temperatures while also wetting the fresh hydrate and recycled ash particles, thereby improving efficiency of the sorbent.

There is also described herein, in an embodiment, a method for removal of sulfur dioxide ($SO_2$) from a flue gas, the method comprising: providing a flue gas duct including a circulating dry scrubber (CDS); and injecting a highly reactive lime hydrate (HRH) into the flue gas in the CDS.

BRIEF DESCRIPTION OF THE DRAWINGS

FIG. 3 provides a table illustrating increased reduction of hydrate use with a high reactivity lime hydrate (HRH) compared to a more traditional hydrated lime composition to control stack $SO_2$ emissions.

DETAILED DESCRIPTION OF THE PREFERRED EMBODIMENT(S)

Figure 1:
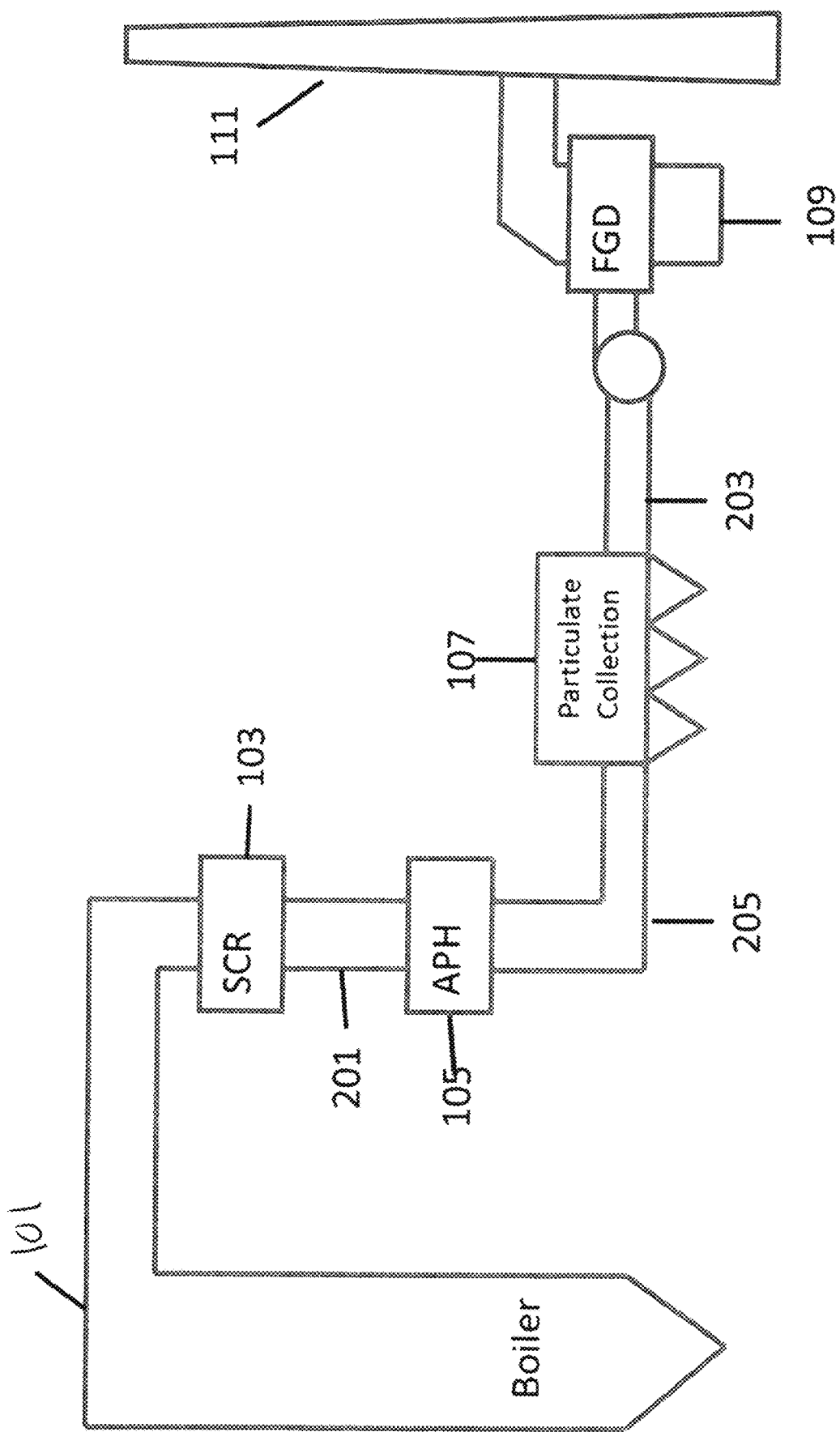
FIG. 1 provides a conceptual block diagram of an embodiment of a flue gas duct system as may be used is, for example, in a coal fired power plant including common components.

Most flue gas scrubbing systems are commonly focused on making sure that certain materials do not leave the flue stack and disperse in the air for environmental reasons. FIG. 1 shows a loose block diagram of an arrangement of a flue gas duct system such as can be used in a coal fired power plant or an industrial facility that generates sulfur dioxides as part of its production process. Generally, major components include the boiler (101), a selected catalytic reduction (SCR) system for reducing NO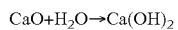 emissions (103), an air preheater (APH) (105), a bag house or electrostatic precipitator (ESP) (107), a Flue Gas Desulfurization (FGD) unit (109), and then the exhaust stack (111).

Traditionally the FGD system (109) has utilized wet flue gas desulfurization (WFGD) which provides wet lime or limestone scrubbers where the calcium source (lime or limestone) is mixed in a slurry and introduced to the gas stream in a large reactor to "scrub" the $SO_2$ from the gas stream.

While WFGD is a very effective technology for scrubbing SO2, The WFGD purge stream is an aqueous solution and generally contains a wide variety of pollutants making it a rather toxic material to handle and dispose of. It, includes gypsum, along with heavy metals, chlorides, magnesium and dissolved organics. In many applications, WFGD purge water is first treated by dewatering to separate synthetic gypsum cake which can be a valuable secondary product. The remaining WFGD purge water is then recycled back to the scrubber. A portion of this water (still containing dissolved chlorides) is removed from the recycle stream (the "chloride purge"), and is subjected to various forms of water treatment (as required) to reduce or eliminate dissolved metals and other contaminants of concern prior to discharge back into the environment in accordance with the applicable permits and laws. As should be apparent, this process is both resource intensive and as regulations on allowed discharge tighten, increasingly difficult to use.

Figure 2:
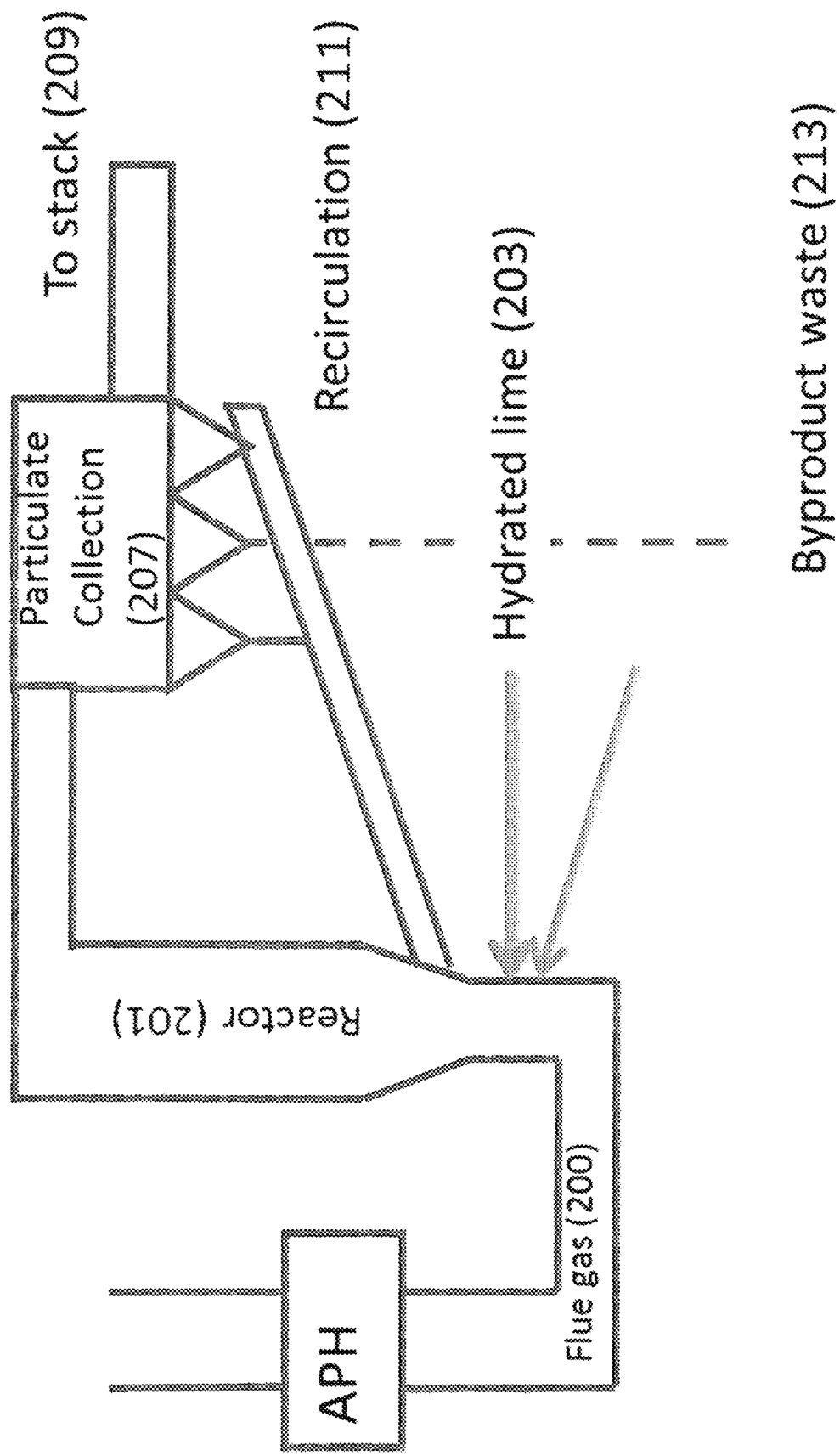
FIG. 2 provides a conceptual block diagram of a circulating dry scrubber (CDS).

Recently, there has been an interest in the use of circulating dry scrubbing (CDS) technology. A CDS is also referred to as circulating fluid bed (CFB). The technology of a CDS is relatively straightforward and is illustrated in FIG. 2. Essentially flue gas (200) is directed into the reaction vessel (201) where hydrated lime (203) (possibly with additional water (205)) is directed into the flue gas stream. This causes the hydrated lime to react with the $SO_2$ to produce calcium sulfite according to Equation 1.

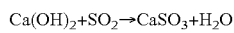

$$Ca(OH)_2 + SO_2 \rightarrow CaSO_3 + H_2O$$

The calcium sulfite may further react with available oxygen to produce calcium sulfate ($CaSO_4$). Hydrated lime can also react with other acid gases in the CDS as well.

Some neutralization occurs in the reactor portion of the CDS ("in-flight capture"). After passing the flue gas through the reactor section, unreacted hydrate, sulfates, sulfites, and fly ash in the flue gas stream collect on electrostatic precipitator plates or, more commonly, fabric filters (207), where additional acid gas neutralization may occur with remaining hydrate. Clean flue gas (209) comes through the ash mixture bed and is discharged to the stack (111). The remaining material, including the bulk of the fly ash and remaining hydrated lime, are returned (211) to the inlet of the reaction vessel (201) to provide for reuse while a portion of the reaction products are removed and disposed of (213) as waste. Thus, hydrated lime is rarely wasted as unreacted sorbent is cycled back into the process for reuse. However, hydrated lime is also available to react with other components of the flue gas, the majority of which is carbon dioxide.

This reaction, which forms calcium carbonate ($CaCO_3$), reduces the efficiency of the hydrated lime both initially and as it is being recirculated and necessitates use of a molar excess of hydrated lime for sufficient reaction with $SO_2$.

One problem with use of hydrated lime in Circulating Dry Scrubber (CDS) systems is the collection of the used lime. Used lime is commonly collected as a particulate (along with fly ash) in a baghouse or other particulate collecting system. Because of the way a CDS works with the spent sorbent being interacted without water, the spent sorbent is pushed further down the flue stream and the amount of particulate generated and that needs to be removed is a multiple of the amount of hydrate originally added. That multiple is commonly around 2 and is often around 1.8.

Without being limited to any particular theory of operation, it is believed that much of this factor is due to the increase in molecular weight of the byproducts when compared to hydrate. As baghouses have to be cleaned to remove captured ash, CDS systems using hydrated lime often result in a substantial increase in the amount of waste to be removed. For smaller plants that have small baghouses, where the waste collection processes are not particularly efficient, or where for industrial processes that generate sulfur oxides as an off-gas and need to remove it, this increase can result in a substantial bottleneck which can substantially reduce the production of the plant.

With the development of a highly reactive lime hydrate (HRH) with properties designed to significantly improve the speed of reaction with acid gases present in flue gas, it became a possibility that HRH may be useable in CDS systems and specifically "in-flight" in such systems. The ability of HRH to capture acid gases in-flight more effectively than conventional hydrated limes is believed to be potentially sufficiently effective to allow for only fresh hydrate to enter the reaction section of the scrubber, eliminating the need to recycle used sorbent. HRH can be manufactured in accordance with a number of processes. In an embodiment, it may be manufactured in accordance with, and/or have the properties discussed in, U.S. patent application Ser. Nos. 13/594,538, 14/180,128, 14/289,278, and 15/344,173 the entire disclosure of all of which is herein incorporated by reference. HRH is notably different from other hydrated lime as it has an improved removal rate of acidic pollutants present in the flue gas where the sorbent is delivered and the rate of removal is generally substantially higher. The use of a high purity, highly reactive hydrated lime such as HRH will have faster neutralization of acidic species.

While it may be provided in a variety of forms, in an embodiment, the HRH is a dry solid free of excess moisture. The product used may also be described by having available calcium hydroxide concentration of greater than 92% by weight, preferentially greater than 94%, and optimally greater than 95%. The product used may also be described by having at least 90% of particles less than 5 microns (D90), at least 50% of the particles are less than 2 microns (D50), and at least 10% of the particles are less than 1 micron and preferentially less than 0.8 microns (D10). The ratio of the D90/D10 is preferentially less than 3 and preferentially around 2.5 or less. The product may also be described as having a BET surface area of at least 20 m²/g, at least 30 m²/g, or at least 40 m²/g. It will usually have a pore volume of at least 0.2 cc/g.

In an embodiment, 90% percent of the particles are less than or equal to about 10 microns and greater than or equal to about 4 microns and a ratio of a size of particle 90% of the particles are below to a size of particle 10% of the particles are below is less than about 8. The particles preferably have a BET surface area of about 18 m/g or greater or about 20 m²/g or greater. Depending on embodiment, the D90/D10 ratio is less than 6, between 4 and 7, or between 5 and 6.

In an HRH like the above, 90% percent of the particles may be less than or equal to about 8 microns and greater than or equal to about 4 microns, less than or equal to about 6 microns and greater than or equal to about 4 microns, or less than or equal to about 5 microns and greater than or equal to about 4 microns.

In an embodiment, 50% of the particles (D50) are less than or equal to about 4 microns, less than or equal to about 2 microns, and may be greater than 1 micron.

In order to test reactivity of particular lime hydrate compounds to determine if they are an HRH, in an embodiment, the reactivity to a weak acid (such as, but not limited to, citric acid) provides for a reactivity time that is measurable with commercial instruments. The problem with determining reaction time to stronger acids is that the reaction can be too quick to effectively measure at laboratory scaling. Thus, it is difficult to predict compositions that will function well without performing large scale pilot testing. In order to determine the citric acid reactivity of a particular hydrated lime composition, the amount of time it took 1.7 grams of lime hydrate to neutralize 26 grams of citric acid was measured. As a measurement of effectiveness, it is preferred that this value be less than or equal to 15 seconds, less than 10 seconds, less than 7 seconds, less than 5 seconds, or preferably less than or equal to 3 seconds.

The HRH will generally be used as part of a circulating dry scrubber system of the off gas of an industrial plant, incinerator, or boiler that combusts sulfur and/or halogenated fuels. Hydrated lime (203) is fed from a silo into a conveying line that disperses the fine powder into the bottom of a reactor (201) in the off gas piping. A predetermined amount of recycled ash (211) is also fed into the reactor (201), as is a quantity of spray water (205) designed to wet the solid particles and drop flue gas temperature. At the top of the reactor (201), the flue gas travels through the duct into a baghouse (207)/(107), where ash collects on the bags while clean flue gas (209) flows through the ash/bag layers. Automated mechanical means dislodge the ash from the bag exterior and this ash is either recycled (211) to the reactor (201) or sent (213) to a landfill or other beneficial use as deemed appropriate.

Because of the highly reactive nature of HRH, in a CDS a finer cloud from the sorbent injection lance puts more sorbent particles in the pathway of acid gases, reaching stratified areas and neutralizing more acid components. The use of a high purity, highly reactive hydrated lime such as HRH will have faster neutralization of acidic species which can be problematic when present in flue gas. Such reactivity enhancement is beneficial especially when the finer cloud from the sorbent injection is used as an input into the scrubber reactor portion of a CDS. This puts more sorbent particles in the pathway of acid gases, reaching stratified areas and neutralizing more acid components.

Further, as the HRH is generally more reactive, it will also result in less material being needed to remove the same amount of gas. Thus, for the same level of removal, less material is used. As indicated above, the spent sorbent ash generation is a multiplier (often around 1.8) of the mass of the lime solvent used. Thus, use of an HRH also produces significantly less spent sorbent, generating less ash, and allowing for a smaller baghouse to be used or for process bottlenecks which previously may have existed based on ash generation to be eliminated.

In an embodiment, it is preferred that a plant may reduce its input sorbent use by at least 20%, more preferably by at least 25%, more preferably by at least 30%, more preferably by at least 35%, on even more preferably by at least 40% over the amount of sorbent used if standard lime hydrate was used. Further, even when lime hydrates having high pore volume (e.g. 0.2 cc/g or above) are used but which lack one or more of the other characteristics of an HRH, HRH still will generally result in a 5-15% reduction in input sorbent use compared to such high pore volume hydrates. As indicated above, a reduction of 20% in sorbent use results in an almost 40% reduction in ash generation. It should be clear that these dramatic increases provide dramatic and unexpected process efficiency increases over use of other lime hydrate.

While CDS systems are perceived to be quite efficient due to multiple cycles of sorbent through the reactor section (That the lime sorbent is recirculated (211)), a majority of acid gas pollutant reduction occurs the first cycle through the system (reactor (201) to baghouse (207)/(107) in a common CDS process). A sorbent with improved capability for in-flight capture exhibits better removal in the reactor (201) than standard sorbent, thus providing better pollutant control (typically monitored via $SO_2$ emission monitoring) with lesser quantities of sorbent.

In an exemplary embodiment, a plant fueled with coal uses a CDS to control stack $SO_2$ emissions. In this embodiment, the plant compared a traditional hydrated lime against performance of an HRH. The CDS operates under a logic-based controller that adjusts the hydrated lime feed rate in order to maintain a near constant $SO_2$ emission as determined by a CEMS monitor in the stack flue gas. The unit and scrubber were operated normally over several days with each type of hydrated lime. Results are outlined in FIG. 3.

Figure 4:
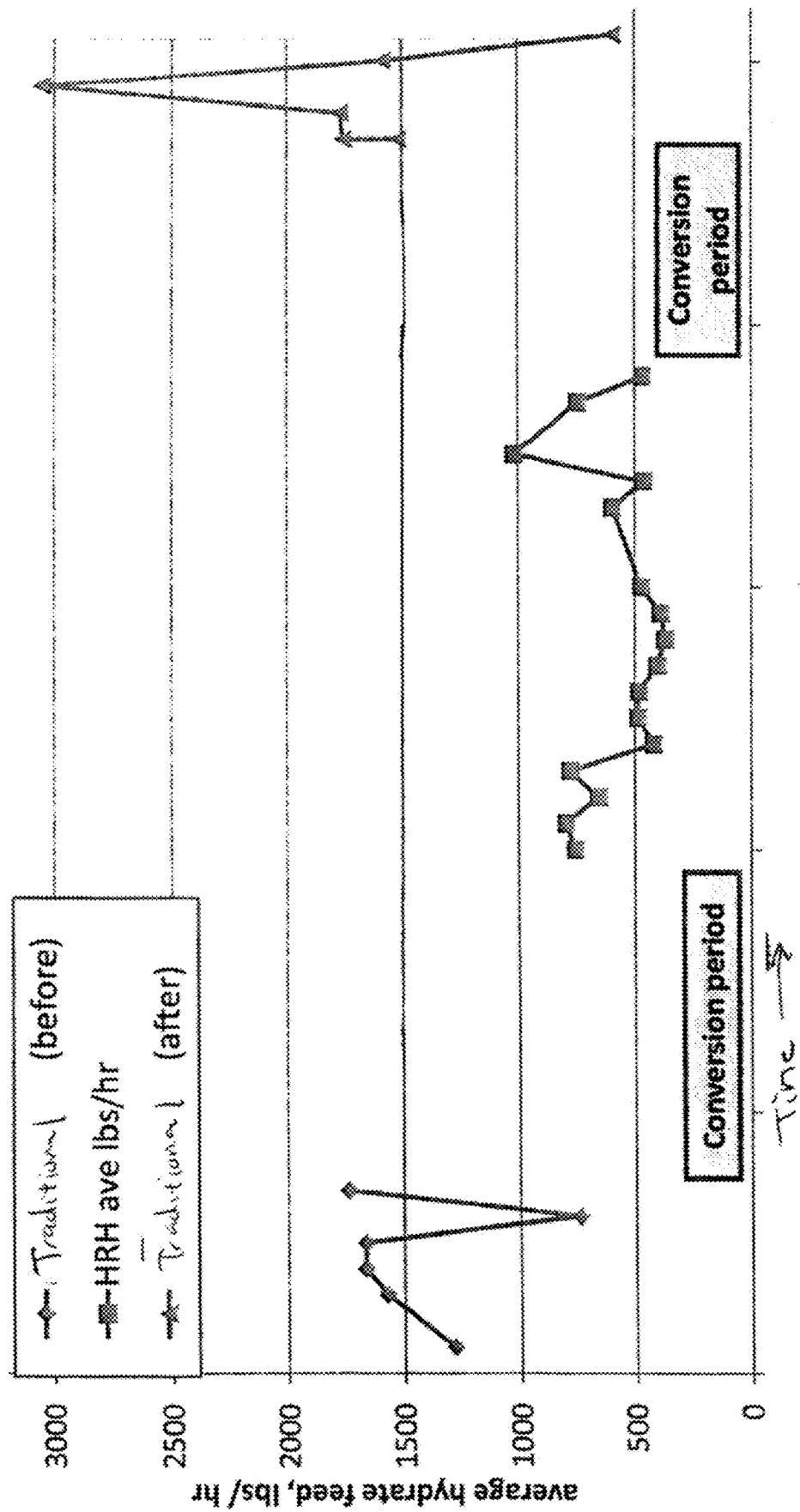
FIG. 4 provides a graph showing average feed rates of HRH and traditional lime hydrate at a full load.
Figure 5:
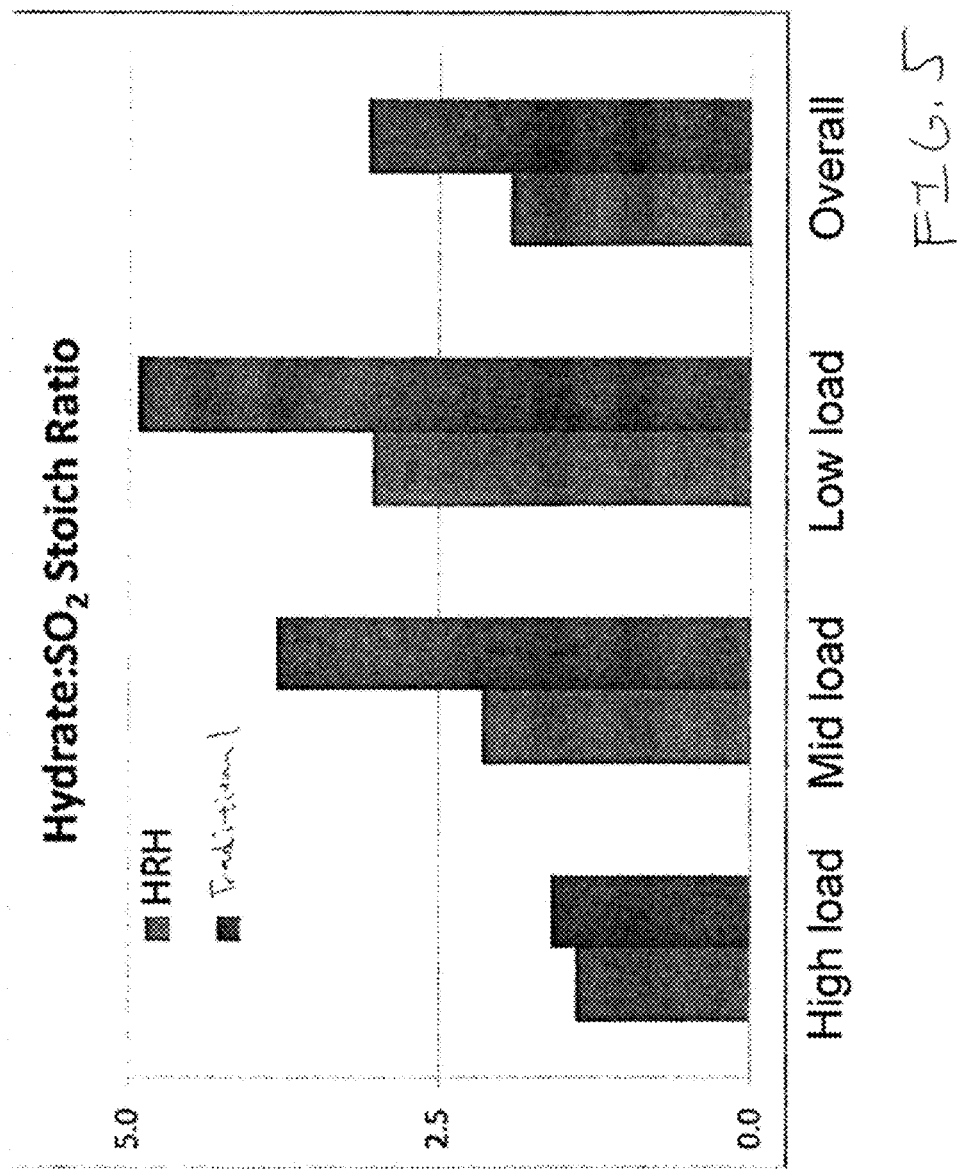
FIG. 5 provides a bar chart showing relative feed rates of HRH and traditional lime hydrate at different load conditions.

As shown in FIG. 3, at all load ranges the CDS required significantly less HRH than traditional hydrated lime in order to maintain desired $SO_2$ emission limits. Scrubber inlet and outlet temperatures are provided to show that temperature variations in the scrubber were not the reason for improved performance with HRH. The experiment was conducted with the CDS first operating on the traditional hydrated lime, then converted to HRH, then converted back. FIG. 4 shows how the plant operated utilizing substantially less sorbent in the HRH window than in either of the others. Further, FIG. 5, which was obtained from a longer term test than that of FIG. 3 shows that the HRH showed dramatic reductions in use at lower loads. Specifically while the reduction at high loads (specifically those of 270 MW or greater in the selected test facility) was good, there is a dramatic reduction at medium loads (between 200-270 MW) and the drop is even more pronounced at low loads (between 125-250 MW). Thus, HRH has shown surprising benefit particularly in low load conditions.

In a still further embodiment, improvements of efficiency were noted by comparing operation of a process similar to the one discussed above using an HRH compared to both a standard lime and a high pore volume lime which did not include the other characteristics of an HRH. In this embodiment, improvements of generally 26-28%, but up to 35% were noted compared to standard hydrates. High pore volume hydrates, which did not meet the requirements to be an HRH, showed improvements of only about 18-20%. Thus, it is clear that an HRH dramatically outperforms its expected level.

The development of a high purity, fast reacting hydrated lime or HRH improves dispersion in the flue gas when the sorbent is delivered to the process. These properties provide a sorbent that increases coverage of the pathway of acid gases and rapidly reacting with those gases to neutralize acidic species in the flue gas.

Without being limited to any theory of operation, increased acid gas capture in-flight improves the sorbent efficiency the first time through the reactor (201) and BH (207)/(107). Since fresh sorbent is believed to capture the most pollutant, there should be differentiation in performance between a traditional hydrated lime and an HRH, but the performance is better than expected. This differentiation evidences itself via reduced hydrated lime requirements to the CDS.

In an embodiment, the use of HRH provides a method of removing $SO_x$ or other acid gases from flue gas of boiler firing sulfur-containing fuel that is advantageous over prior art due to tighter particle size distribution of the hydrated lime sorbent. Advantageous generally refers to reduced sorbent quantities required to achieve similar reduction in concentration of $SO_x$ that end user requires for traditional hydrated lime.

In an embodiment, this also provides a method of removing $SO_2$ from flue gas of boiler firing sulfur containing fuel that is generally advantageous due to more rapid reactivity of hydrated lime sorbent, as characterized by acid reactivity test. Here, advantageous refers to greater reductions in concentration of $SO_2$ that end user experiences when using standard hydrated lime.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A system for removal of acid gas from a flue gas, the system comprising:
    a flue gas duct having a flow of flue gas, said flue gas duct including:
        a circulating dry scrubber (CDS) including a reactor section;
        an injection system for injecting a highly reactive lime hydrate (HRH) into said flue gas in said reactor section;
        HRH positioned within said flue gas duct and said injection system; and
        a particulate collection system for returning collected ash to said reactor section;
        wherein said reactor section is positioned upstream of said particulate collection system in said flow of flue gas; and
        wherein said HRH is fed from said injection system to said flue gas duct at a rate of less than 1000 lb./hr.

2. The system of claim 1 wherein water droplets are also injected into said reactor section with said HRH.

3. The system of claim 1 wherein said HRH comprise particulate lime hydrate wherein:
    90% percent of particles in said particulate lime hydrate are less than or equal to about 10 microns and greater than or equal to about 4 microns in size;
    a ratio of a size of particle said 90% of said particles are below to a size of particle 10% of said particles are below is less than 8; and
    said particles have a BET surface area of about 18 $m^2/g$ or greater.

4. The system of claim 3 wherein said ratio is less than 6.

5. The system of claim 3 wherein said ratio is between about 4 and about 7.

6. The system of claim 3 wherein the ratio is between about 5 and about 6.

7. The system of claim 3 wherein 90% percent of said particles are less than or equal to about 8 microns and greater than or equal to about 4 microns.

8. The system of claim 3 wherein 90% percent of said particles are less than or equal to about 6 microns and greater than or equal to about 4 microns.

9. The system of claim 3 wherein 90% percent of said particles are less than or equal to about 5 microns and greater than or equal to about 4 microns.

10. The system of claim 3 wherein said particles have a BET surface area of about 20 $m^2/g$ or greater.

11. The system of claim 3 wherein 50% of said particles are less than or equal to about 4 microns.

12. The system of claim 3 wherein 50% of said particles are less than or equal to about 2 microns.

13. The system of claim 1 wherein said HRH is fed at a rate of less than 750 lb./hr.

14. The system of claim 1 wherein said HRH is fed at a rate of less than 600 lb./hr.

15. The system of claim 1 wherein said HRH has citric acid reactivity of less than 10 seconds.

16. The system of claim 1 wherein said HRH has citric acid reactivity of less than 7 seconds.

17. The system of claim 1 wherein said acid gas comprises sulfur dioxide ($SO_2$).

18. The system of claim 1 wherein said acid gas comprises hydrochloric acid (HCl).

19. The system of claim 1 wherein said acid gas comprises sulfur trioxide (SO3).

* * * * *